United States Patent [19]

Porter et al.

[11] 3,858,460
[45] Jan. 7, 1975

[54] FOUR SPEED MANUAL TRANSMISSION AND CONTROL

[75] Inventors: Fred C. Porter, Birmingham; Laszlo Nagy, St. Clair Shores, both of Mich.

[73] Assignee: General Motors Corporation, Detroit, Mich.

[22] Filed: Nov. 12, 1973

[21] Appl. No.: 415,221

[52] U.S. Cl.................... 74/753, 74/754, 192/3.52, 192/3.57
[51] Int. Cl............................................. F16h 3/44
[58] Field of Search ............ 74/753, 754; 192/3.52, 192/3.57

[56] References Cited
UNITED STATES PATENTS
| | | | |
|---|---|---|---|
| 3,128,642 | 4/1964 | Fisher et al. | 192/3.57 X |
| 3,352,392 | 11/1967 | Black et al. | 192/3.57 |
| 3,799,304 | 3/1974 | Richmond et al. | 192/3.57 |

Primary Examiner—Samuel Scott
Assistant Examiner—John Reep
Attorney, Agent, or Firm—Donald F. Scherer

[57] ABSTRACT

A manually shiftable planetary transmission and control providing four forward drive ratios and a reverse drive ratio. The forward ratios and the reverse ratio are established and interchanged by the operator through the selectively controlled application of a forward clutch and a direct-reverse clutch respectively. A manual clutch modulator valve is manipulated by the operator to control the engagement pressure of the clutches when ratios are being established or interchanged. The ratios are interchanged by the operator through the use of the clutch modulator valve and a manual selector valve which selector valve also conditions a relay valve to direct the controlled engagement pressure from the clutch modulator valve to the proper clutch for the establishment of the ratio selected by the operator. Positioning of the selector valve also conditions other clutches and brakes in the transmission without modulated engagement.

2 Claims, 3 Drawing Figures

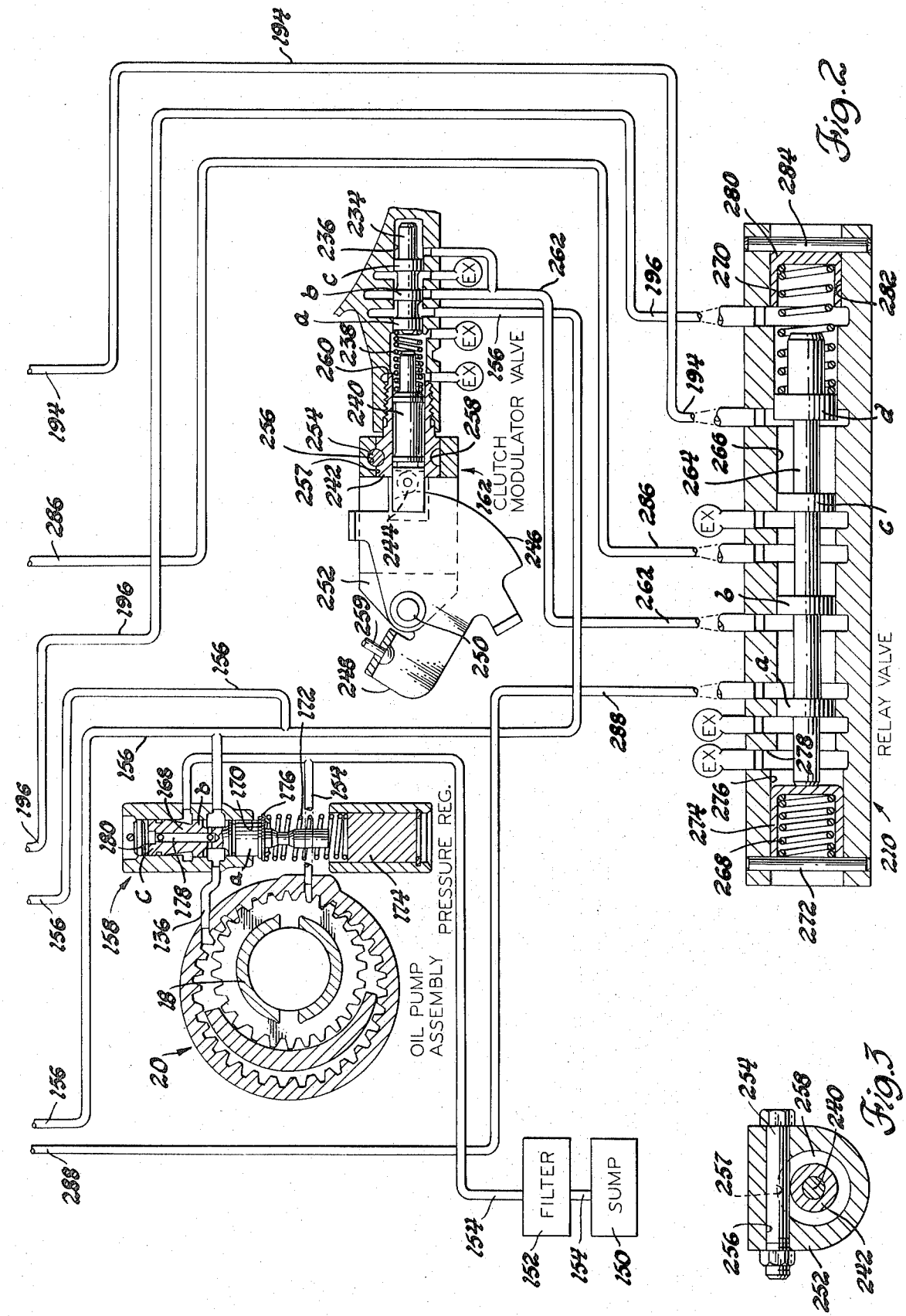

FOUR SPEED MANUAL TRANSMISSION AND CONTROL

This invention relates to planetary gearing transmissions and controls, and more particularly to planetary gearing transmissions having manually controlled clutch engagement and disengagement.

Planetary gearing transmissions presently in use incorporate a fluid drive, such as a torque converter or a fluid coupling, between the engine and the planetary input clutches. The slip factor, which is present at all times during operation of the transmission, is a disadvantage in the use of the fluid drive. The slip factor in the fluid drive is a loss in the transmission which results in a lower overall efficiency of the drive train.

Prior art transmissions have attempted to eliminate the fluid drives in transmissions by incorporating a manually operable or fluid operated type clutch in place of the torque converter. This clutch, in the prior art, is an additional clutch to the transmission, which of course required additional cost in manufacturing. While the addition of such a clutch to the transmission did improve the overall efficiency of the transmission, it also increases the cost. These types of clutches are used in synchromesh or countershaft type transmissions today.

The present invention, eliminates the use of the torque converter and does not add a clutch to the planetary transmission. This is accomplished by utilizing the input clutches of the transmission to provide starting clutches. The input clutches are fluid operated disc type clutches which provide a drive connection between the transmission input shaft and the planetary gearing.

In most transmissions used today, there are two input clutches, one for forward drives and another for reverse drive. In the conventional automatic power transmission, using multiple input clutches, the torque converter or fluid coupling is provided as a slipping connection between the engine and the input clutches. Thus the input clutches can be engaged, with the engine running, and the fluid drive permits a slip connection so that the engine will not stall. The present invention provides for manual engagement of the input clutches such that the clutches can be provided with a slipping engagement during initial startup of the vehicle or when the operator is changing ratios in the forward drive.

These clutches are controlled through a manually operable modulator valve which provides a variable fluid pressure in response to operator movement of the clutch pedal in the vehicle. The modulated clutch pressure is directed by a relay valve to either of the input clutches depending upon the travel direction selected by the operator. If the operator has selected forward drive, for example, the forward clutch is applied with fluid pressure through the relay valve. During the forward drive, the operator is permitted to upshift from first to second and so forth. During each upshift the operator manually depresses the clutch to disengage the forward input clutch, by reducing the clutch pressure at the modulator valve.

During reverse drive the relay valve is positioned, by a manual selector valve, to accommodate reverse operation in which the modulated clutch pressure is directed to the other input clutch. In the preferred embodiment the reverse clutch is also engaged in the forward direct drive. In the forward direct drive the clutch is engaged through a supply of pressure which is directed thereto at full line pressure through the manual selector valve.

It is an object of this invention to provide in an improved transmission and control wherein the transmission has two input clutches and the control has a manually operable regulator valve which supplies a controlled pressure to the input clutches when engagement of the clutches is desired by the operator.

It is another object of this invention to provide an improved transmission and control wherein the transmission has an input clutch for forward drive and an input clutch for reverse drive and the control provides a manual valve for selecting forward or reverse drive and also includes an operator controlled pressure control valve which is operative to establish clutch engagement pressure by the operator.

It is another object of this invention to provide in an improved transmission and control, input clutches for forward and reverse drives, a manual selector valve for selecting the drive, a manually controlled pressure source for establishing engagement pressure for the clutches and a relay valve positioned by the manual selector valve for distributing the manually controlled pressure to the proper clutch.

These and other objects of this invention will be more apparent from the following description and drawings in which:

FIG. 2 is a diagrammatic representation of the remainder of the transmission and control system which when adjoined to FIG. 1 shows the complete transmission control; and FIG. 3 is a cross-sectional view of a portion of the control.

Figure 1:
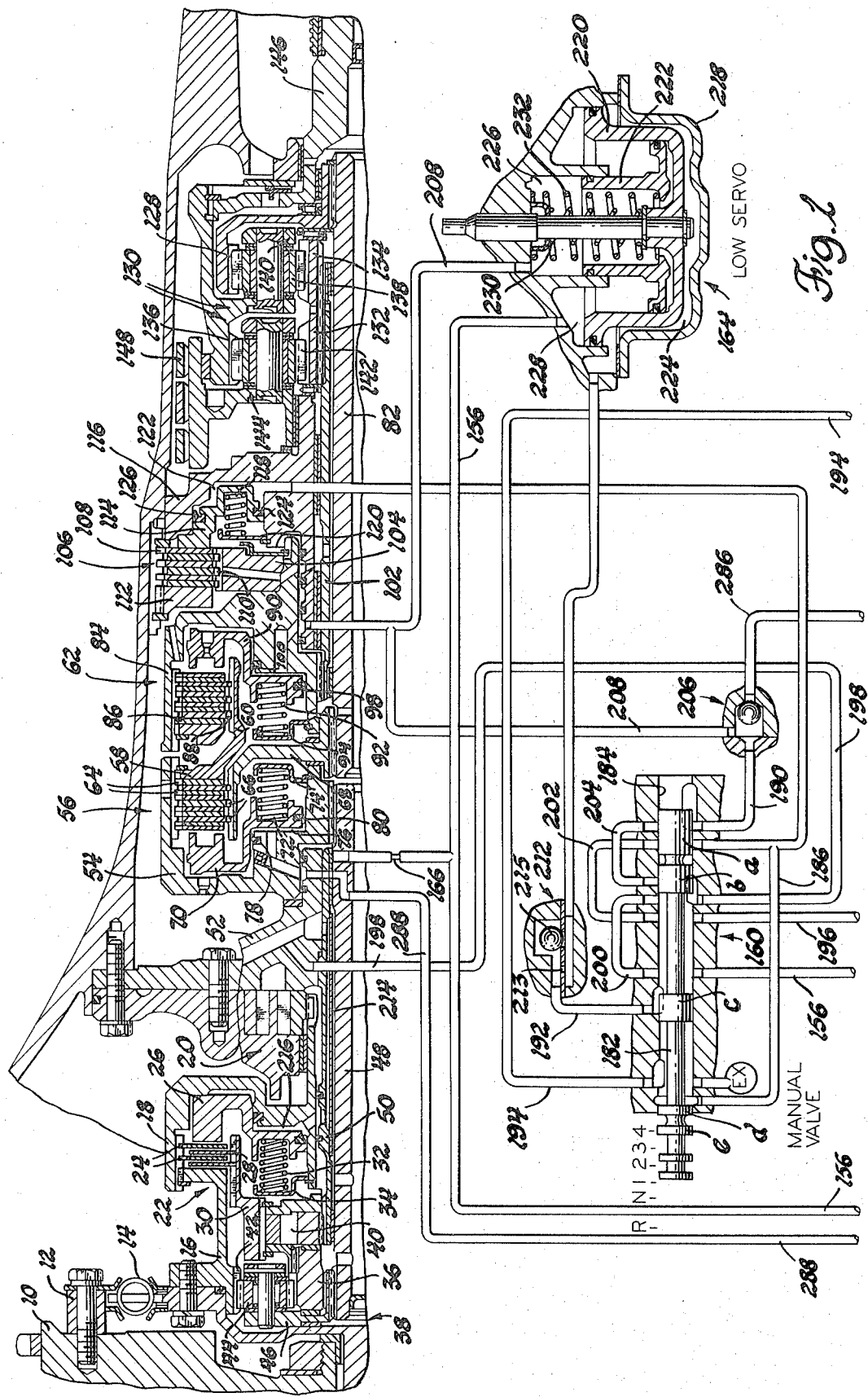
FIG. 1 is a cross-sectional view of the transmission structure and a portion of the transmission control shown in diagrammatic representation.

Referring to the drawings particularly FIG. 1, there is shown an engine output member 10 to which is drivingly connected a flex or drive plate 12 which includes a conventional torsional dampener 14. The drive plate 12 is secured to a hub 16 which is splined to a clutch housing 18, which housing 18 is splined to drive a hydraulic pump 20 which supplies fluid pressure to the transmission control. The clutch housing 18 is a component of the front clutch generally designated 22 which also includes a plurality of friction discs 24 in splined engagement with the housing 18, an engagement piston 26 slidably disposed in the housing 18, a plurality of friction discs 28 splined to an output hub 30 and a return spring 32 trapped between a piston 26 and a retainer member 34 secured to the housing 18. The output hub 30 is connected by a spline to a sun gear 36 which is a member of the front planetary gear set 38 and also to a portion of a one way brake 40.

The planetary gear set 38 also includes a ring gear 42, integrally formed on the hub 16, a plurality of pinion gears 44 meshing with the sun gear 36 and ring gear 42 and being rotatably mounted on a planet carrier 46. The planet carrier 46 is splined to a transmission input shaft 48.

The one way brake 40 is splined to a stationary sleeve shaft 50 which is secured to a pump housing 52 which in turn is secured to the transmission housing. The pump housing 52 houses the fluid pump 20, which pump 20 is a conventional internal external type gear pump as shown in FIG. 2. The one way brake 40 is operable to prevent rotation of the sun gear 36 in a direction opposite to the ring gear 42. However when the clutch 22 is engaged, the sun gear 36 and ring gear 42 are driven in the same direction in unison. Thus the front planetary gear set 38 provides a reduction drive, via the carrier 46, to the transmission input shaft 48 when the one way brake 40 is operable, and a one to one drive from the engine to the transmission input shaft 48 when the clutch 22 is engaged.

The transmission input shaft 48 is splined to a clutch hub 54 which is a portion of the forward clutch generally designated 56. A pressure plate 58 is also splined to the clutch hub 54 and is formed to provide an input member 60 for a direct-reverse clutch 62. The forward clutch 56 includes a plurality of friction discs 64 splined to the hub 54, a plurality of friction discs 66 splined to a forward clutch output member 68, an engagement piston 70 slidably disposed in the clutch housing 54, and a plurality of return springs 72 compressed between the piston 70 and a retainer member 74. Thie clutch piston 70 and housing 54 cooperate to provide an engagement chamber 76 which is sealed by a pair of annular lip seals 78 and 80. The clutch 56 is designed to operate such that when fluid pressure is admitted to chamber 76, the piston 70 will urge the friction plate 64 and 66 into engagement thereby providing a friction drive between the clutch hub 54 and the clutch output member 68. The clutch output member 68 is splined to an intermediate shaft 82.

The direct-reverse clutch 62 includes an output member 84, a plurality of friction discs 86 splined to the output member 84, a plurality of friction discs 88 splined to the input member 60, a clutch piston 90 slidably disposed in the member 84, and a plurality of return springs 92 compressed between the piston 90 and a retainer plate 94 which is secured on the output member 84. The piston 90 and output member 84 cooperates to form a clutch engagement chamber 96 which is sealed by a pair of annular lip seals 98 and 100. The output member 84 is splined to an intermediate sleeve shaft 102, and also secured to a hub 104 which forms part of the third gear brake 106.

The brake 106 includes a plurality of friction discs 108 splined to the transmission housing, a plurality of friction discs 110 splined to the hub 104, a pressure plate 112 splined to the transmission housing, a piston 114 slidably disposed in a brake housing 116 which is secured to the transmission housing and a plurality of return springs 118 compressed between the piston 114 and a retainer plate 120. The piston 114 and brake housing 116 cooperate to provide a brake chamber 122 which is sealed by a pair of annular lip seals 124 and 126.

The clutch 62 and brake 106 are operable by admitting fluid pressure to chambers 96 and 122 respectively, such that during engagement of the clutch 84, the sleeve shaft 102 is driven directly by the transmission input shaft 48, and during engagement of the brake 106 the sleeve shaft 102 is held stationary.

The intermediate shaft 82 is drivingly connected through a spline to a ring gear 128 which is a component in a three speed and reverse planetary gearing arrangement generally designated 130. The intermediate sleeve shaft 102 is splined to a pair of integral sun gears 132 and 134 both of which are members of the planetary gearing arrangement 130. The planetary gearing arrangement 130 also includes a ring gear 136, a plurality of planet pinions 138 rotatably mounted on a planet carrier 140, and a plurality of planet pinions 142 rotatably mounted on a planet carrier 144. The planet pinions 138 mesh with the sun gear 134 to ring gear 138, and the carrier 140 drivingly connected, along with the ring gear 136, to a transmission output shaft 146. The planet pinions 142 mesh with the ring gear 136 and sun gear 132, and the planet carrier 144 is adapted to be held stationary by a selectively engageable double wrap band 148. The double wrap band 148 may be constructed in accordance with the U.S. Pat. No. 2,975,890 issued to E. J. Vosler et al. on Mar. 21, 1961. The planetary gearing arrangement 130 is constructed in accordance with the planetary gearing arrangement disclosed in U.S. Pat. No. 2,856,794 issued to H. W. Simpson on Oct. 21, 1958. This planetary gearing arrangement 130 provides three forward speed ratios in the reverse ratio. The front gear set 38 provides a reduction ratio and a one to one ratio such that, when combined with the planetary gear set 130 through the input clutches 56 and 62, the transmission provides four forward speed ratios and one reverse ratio.

To establish the lowest forward speed ratio in the planetary gear set 130 the brake 148 is engaged along with the clutch 56. The forward gear set is in reduction drive through the automatic engagement of the one-way brake 40 such that the overall gear ratio from engine to transmission output shaft will be equal to the product of the ratio in the front gear set and the low ratio in the planetary gear set 130. To establish second ratio in the transmission, the front clutch 22 is engaged while the band 148 and clutch 56 remain engaged. To establish third gear in the transmission the front clutch 22 remains engaged, the forward clutch 56 remains engaged, while the band 148 is disengaged and the brake 106 is engaged. Fourth gear or direct drive is established when the front clutch 22 is engaged, the forward clutch 56 is engaged, and the direct-reverse clutch 62 is engaged while the brake 106 is disengaged. Reverse drive is established in the transmission by engaging the direct-reverse clutch 62 and the band 148 while the remaining friction devices including front clutch 22 are disengaged. Thus in reverse drive, the overall transmission ratio, from the engine to the transmission output shaft 146, is the product of the reduction drive ratio in the front gear set 38 and the reverse drive ratio in the planetary gear set 130.

The various clutches and brakes of the transmission, with the exception of one way brake 40, are fluid operated type friction drive establishing devices. These types of devices require fluid pressure from a control system to permit the application of the clutches and brakes to establish the drive ratios in the transmission. The band 148 is controlled by a servo device which is pressurized to cause the band to clamp down on the carrier 144 that it is encircling. The fluid pressure, to engage the various friction devices in the transmission, is supplied by the fluid pump 20, which is continuously driven by the engine through the flex plate 12 and the clutch housing 18.

As seen in FIG. 2, the pump 20 draws fluid from a sump or reservoir 150 through a filter 152 via inlet passage 154. Fluid pressure is delivered from pump 20 to the main line passage 156, the pressure in which passage 156 is established by a pressure regulator valve 158. Line pressure in passage 156 is delivered to a manual valve 160, a clutch modulator valve 162, a low servo 164, and a restriction 166. Fluid passing through the restriction 166 is delivered to the lubricating system of the pump to lubricate and cool the various components of the transmission, particularly the forward clutch 56 and the direct-reverse clutch 62. The low servo 164 is used to engage the band 148 during first and second forward gear ratios and the reverse gear ratio.

PRESSURE REGULATOR

The pressure regulator valve 158 includes a valve spool 168 having equal diameter spaced lands a, b, and c slidably disposed in a valve bore 170 and a compression spring 172 compressed between spring seat 174 secured in the valve body and a spring seat 176 secured to the valve spool 168. Fluid in passage 156 passes between lands a and b and is distributed by a crossdrilled passage 178 to a chamber 180 formed between one end of valve bore 170 and valve land c. When the fluid pressure in chamber 180 is sufficient to overcome the force in spring 172, the valve spool 168 will move in the valve bore 170 to permit fluid communication between passage 156 and passage 154 intermediate lands b and c, such that excess fluid in the system is returned to the pump inlet or the reservoir 150.

MANUAL SELECTOR VALVE

The manual valve 160 is a manually operable selector valve 182 which includes a valve spool having equal diameter spaced lands a, b, c, d, and e adapted to be slidable in a valve bore 184. The valve bore 184 is in fluid communication with the main line passage 156, a third ratio passage 186, a fourth ratio passage 190, a low-reverse apply passage 192, a reverse signal passage 194, a forward signal passage 196, a front clutch engage passage 198, and three interconnect passages 200, 202, and 204.

The valve spool 182 may be selectively positioned in a reverse (R), neutral (N), or forward drive positions (1, 2, 3, or 4). The valve spool 182 is shown in the second ratio forward position (2) such that the line passage 156 is in fluid communication with the front clutch passage 198 the forward signal passage 196, and the low-reverse apply passage 192 while the remaining passages are connected to exhaust. When the valve spool 182 is moved to the first forward position (1), the pressure connections are the same as second gear except that the front clutch passage 198 is exhausted through interconnect passage 204 and the end of the valve bore 184. In the neutral position (N), fluid communication is provided between the line passage 156 and the low-reverse apply passage 192 while the remaining passages are exhausted. In the reverse position (R), fluid pressure in line passage 156 is communicated to the reverse signal passage 194 and the low reverse apply passage 192. In the third gear forward position (3), line pressure in passage 156 is communicated to the forward signal passage 196, the forward clutch passage 198, and the third ratio apply passage 186 while the remaining passages are connected to the exhaust. In the fourth gear forward or direct drive position (4), the fluid pressure in main line passage 156 is connected to the forward signal passage 196, the front clutch passage 198, and the fourth gear engage passage 190, while the remaining passages are connected to exhaust. Fluid pressure in the fourth engage passage 190 is directed through a shuttle valve 206 to a direct apply passage 208 which is in fluid communication with the clutch engage chamber 96 and the low servo 164.

Fluid pressure in passage 186 is in fluid communication with the chamber 122 of brake 106. The reverse signal passage 194 and forward signal passage 196 are in fluid communication with a relay valve 210. The low-reverse apply passage 192 is in fluid communication through a timing valve 212 with the low servo 164. The forward clutch passage 198 is in fluid communication through the pump housing 52 and a passage formed between the sleeve shaft 50 and an annular sleeve member 214 with a chamber 216 formed in the front clutch 22 between piston 26 and clutch housing 18. The timing valve 212 has a restriction 213 and a ball check valve 215 to permit controlled pressure rise in the servo 164 and rapid pressure decrease.

The servo 164 which is used to apply the band 148, is formed in the transmission case and is covered by a cap 218 which is secured to the case. The servo incorporates two piston and seal assemblies 220 and 222 both of which are slidably disposed in the transmission case. The piston 222 is also slidably disposed within the piston 220. The piston 220 and the cap 218 cooperate to form an apply chamber 224. The piston 222 and the housing cooperate to form a chamber 226 while the two pistons 222 and 220 cooperate to form a chamber 228. The chambers 228 and 226 are release chambers such that when fluid pressure is not supplied to chamber 224 the band 148 will be released. A pair of release springs 230 and 232 are compressed between the transmission housing and the piston 220 and the piston 222 respectively. These springs also assist the release of the servo 164 and band 148. The chamber 224 is in fluid communication with the low-reverse apply passage 192 downstream of the timing valve 212. The chamber 228 is in fluid communication with line passage 156, and the chamber 226 is in fluid communication with the direct apply passage 208. When the manual valve 160 is in the neutral (N), first (1), or second (2) position, fluid pressure is supplied through the passage 192 and timing valve 212 to the chamber 224 to apply the brake band 148 at a controlled rate. When the manual valve is in the reverse position (R), fluid pressure is also supplied via passage 192, and timing valve 212 to apply the band 148. In the neutral (N), first (1), and second (2) positions, the fluid pressure in chamber 224 must overcome the fluid pressure in chamber 228 and the return springs 230 and 232 to engage the servo and the band 148 while in the reverse position (R), the fluid pressure in chamber 224 must overcome the pressure in chamber 228, the return springs 230 and 232, and also the modulated clutch pressure in passage 208 which is present when the clutch 62 is engaged for reverse operation. When the manual valve 160 is in the third (3) and fourth (4) position, the chamber 224 is exhausted such that fluid pressure in chamber 228 and the return spring 230 and 232 will move pistons 220 and 222 to disengage the band 148.

The clutch modulator valve 162 includes a valve spool 234 having spaced equal diameter lands a, b, and c slidably disposed in a valve bore 236, and a compression spring 238 compressed between the valve spool 234 and a manual control plunger 240. The manual control plunger 240 is slidably disposed in a sleeve 242 which is threadably secured in the transmission housing. A cam roller 244 is rotatably mounted on the manual plunger 240 and is in abutting relationship with a cam surface 246 formed on a manual control cam 248. The roller 244 is held into abutting relationship with the cam surface 246 by the compression spring 238. The manual control cam 248 is rotatably supported by a pin 250 on a bracket 252, which bracket 252 is operatively connected to the sleeve 242 by a bolt 254 which passes through a drilled opening 256 in the bracket 252, and an annular groove 258 of semicircular cross-section formed in the sleeve 242. As seen in FIGS. 2 and 3, the opening 256 is drilled such that only a semicircular opening is formed in the bracket 254 at the point on the diameter 257 of the bracket 252 where the opening 256 and the groove 258 in sleeve 242 are in alignment. This permits the bracket 252 to rotate relative to the sleeve 242 such that the sleeve 242 can be fully threaded into the transmission housing until the end 260 thereof abuts the transmission housing. This permits the position of the threaded sleeve member 242 in bracket 252 to be positioned in the transmission housing in a fixed location such that the minimum or clutch release spring position can be acurately controlled. The bolt 254 permits the bracket 252 to rotate relative to the sleeve 242 so that the rotational position of bracket 252 is not critical to the longitudinal position of sleeve 242.

The manual control cam is connected by a cable 259, to a conventional vehicle clutch pedal, not shown, such that the operator can manually rotate the cam 248 about the pin 250. As the cam 248 is rotated in a counterclockwise direction, from the position shown, the cam surface 246 moves the manual plunger 240 to the right against spring 238, thereby increasing the spring load on valve 234. As the cam 248 is rotated in a clockwise direction to the position shown, the spring load will decrease. Thus the operator has control over the force in spring 238 which, as will be explained below, controls the pressure utilized to engage the clutches 56 and 62.

The valve bore 236 of the clutch modulator valve 162 is in fluid communication with the line passage 156, a modulated clutch pressure passage 262, and three exhaust passages. The line passage 156 is in fluid communication with bore 236 between lands a and b of valve spool 234, and the modulated clutch pressure passage 262 is in fluid communication between valve land c and one end of valve bore 236 and also in fluid communication adjacent land b. The clutch modulator valve 162 operates as a pressure reducing valve with a manual input control. When the operator manipulates the cam 248 through the clutch pedal not shown, the valve spool 234 is moved to the right such that fluid pressure in passage 156 is directed between lands a and b to the modulated clutch pressure passage 262. Fluid pressure in passage 262 increases until the fluid pressure operating on valve land c and therefore the end of spool 234 is sufficient to overcome the spring force in spring 238. At this time, the valve spool will move to the left to discontinue fluid communication between passages 156 and 262 between lands a and b to maintain fluid pressure in passage 262 at the level established by the operator. If the force in spring 238 is decreased, such as when the operator depresses the clutch pedal to cause disengagement, the fluid pressure in passage 262, operating on the end of valve spool 234 will move the valve spool 234 further to the left thereby permitting the excess fluid pressure in passage 262 to be exhausted between lands b and c. Thus, depending on the position of the cam 248, established by the operator, the fluid pressure in passage 262 is manually controlled. In the preferred embodiment, the spring 238 is designed such that when the cam surface 246 is in a position to move the plunger 242 to the left against the spring 238 the maximum amount, the pressure in passage 262 required to balance the force then present in spring 238 will be less than the line pressure established by the regulator valve 138. The cam and valve arrangement for the clutch modulator valve 162 is shown in the exhausted or disengaged positions.

The relay valve 210 includes a valve spool 264 having spaced equal diameter lands a, b, and c and a larger diameter land d slidably disposed in a stepped valve bore 266. The valve spool 264 is positioned in valve bore 266 by a pair of compression springs 268 and 270. Spring 268 is compressed between a pin 272 and a valve seat 274 which abuts one end of valve spool 264. The seat 274 is slidably disposed in a bore 276 which is of larger diameter than the bore 266 such that when the spring 268 moves the seat 274 to the right, the seat 276 will abut a shoulder 278. The spring 270 is compressed between valve land d and a spring seat 280 which is positioned in a valve bore 282 by a pin 284. The spring 270 has less preload than the spring 268 such that, when the valve spool 264 has no biased pressure thereon, the spring 268 will position the valve spool 264. The valve bore 266 is in fluid communication with the forward signal passage 196, the reverse signal passage 194, the modulated clutch pressure passage 262, a reverse modulated apply passage 286, a forward modulated apply passage 288, and three exhausted passages. The valve spool 264 is shown in the forward position. The forward position is obtained when the manual valve is in the first (1), second (2), third (3), or fourth (4), position such that fluid pressure in passage 196 is directed to the spring chamber between land d and spring seat 280 to cause the valve spool 264 to move to the left against spring 268. In the forward position shown, the modulated clutch pressure passage 262 is in fluid communication between lands a and b with the forward modulated apply passage 288, the reverse modulated apply passage 286 is exhausted between lands b and c, and the reverse signal passage 194 is exhausted at the manual valve 160. To establish the reverse position of the relay valve 210, fluid pressure from the manual valve 160 is directed through the reverse signal passage 194 to the differential area between lands c and d to move the valve spools 264 to the right against spring 270. In the reverse position, the forward signal passage 196 is exhausted at the manual valve 160. When the valve spool 264 is in the reverse position, the reverse modulated apply passage 286 is in fluid communication between lands a and b with the modulated clutch pressure passage 262, while the forward modulated apply passage 288 is exhausted between land a and the spring seat 274. When the manual valve 160 is in the neutral position, the valve spool 264 will be positioned by the spring 268 such that the forward modulated apply passage 288 is exhuasted between land a and spring seat 274. The reverse modulated apply passage 286 is exhausted between land b and c, and the modulated clutch passage 262 is blocked from fluid communication through the valve 210 by the lands a and b. When the manual selector valve is in the neutral position, neither of clutches 56 or 62 can be engaged. When the manual selector valve 160 is in the forward position, the clutch 56 can be manually controlled by the operator through the clutch modulator valve 162 since the fluid pressure in forward modulator apply passage 288 is directed to the apply chamber 76 of the clutch 56. As the operator shifts from neutral to first (1), the operator depresses the clutch pedal to prevent engagement of the clutch 56 and then releases the clutch pedal, at a controlled rate, to control the engagement of clutch 56 to start the vehicle moving. When the operator upshifts from first to second, or second to third, or third to fourth, he depresses the clutch pedal each time to exhaust the clutch 56 while the upshift is being made, and then releases the clutch pedal to control the engagement of the clutch to establish the new ratio. This same manuever is followed during downshifting. The operator controls the engagement of clutch 62 during a shift from neutral to reverse. The clutch 62 is controlled in the same manner as the clutch 56 is controlled since fluid pressure in the reverse modulated apply passage 286 is directed through the shuttle valve 206 to the direct apply passage 208 which is in fluid communication with the apply chamber 96 of clutch 62.

When the operator desires to shift from neutral to reverse, he depresses the clutch to provide a minimum pressure in modulated clutch passage 262 and moves the manual selector to reverse. Once the manual selector has been positioned in reverse, the operator can release the clutch pedal at a controlled rate to control the engagement of clutch 62. The minimum clutch pressure established, when the clutch is disengaged by the operator, is not sufficient to overcome the return springs 92 or 72 in the clutches 62 or 56 respectively. The foregoing control system, is shown with a well known three speed transmission, as discussed above. However, this control system can be used with any of the prior art transmissions which utilize dual input clutches, that is, one input clutch for reverse, and the other input clutch for forward. As discussed above, these transmissions frequently utilize a torque converter between the engine output and the transmission input such that the input clutches can be engaged automatically while the torque converter or fluid coupling absorbs the shift energy which is present. The present invention permits the fluid coupling to be eliminated from the transmission but does not incorporate an additional shifting clutch as shown in many of the prior art transmissions.

Obviously, many modifications and variations of the present invention are possible in light of the above teachings. It is therefore, to be understood, that within the scope of the appended claims, the invention may be practiced otherwise than as specifically described.

What is claimed is:

1. A planetary gearing power transmission and control comprising; input means for transmitting power to the transmission; output means for delivering power from the transmission; planetary gearing means for transmitting power from said input means to said output means at a plurality of drive ratios and including first fluid operated clutch means being selectively engageable and disengageable for controlling the establishment of a plurality of forward drive ratios, second fluid operated clutch means being selectively engageable and disengageable for controlling the establishment of a reverse drive ratio and cooperating with said first clutch means for establishing a one to one forward ratio, and a plurality of fluid operated friction drive establishing means being selectively engageable for cooperating with said first and second clutch means for establishing said drive ratios in said planetary gearing means; fluid pressure source means for providing fluid pressure to operate both said clutch means and said plurality of friction drive establishing means; manual selector valve means movable to a plurality of positions for selectively distributing fluid pressure from said source means to said plurality of friction drive establishing means during the establishment of all forward drive ratios except the one to one forward drive ratio and to said second clutch means during the establishment of said one to one forward drive ratio; manually operated clutch modulated valve means in fluid communication with said source means for generating a variable clutch engagement control pressure for selectively controlling the engagement and disengagement of said first and second clutch means; and relay valve means in fluid communication with said manual selector valve means and being positionable in a forward position or a reverse position by fluid pressure from said manual selector valve means and for directing the variable clutch engagement control pressure to said first clutch means when the forward position is established and to said second clutch means when said reverse position is established for permitting selective engagement and disengagement of said clutch means by the operator when manual selector valve means is being moved between forward drive positions or to the reverse drive position.

2. A planetary gearing power transmission and control comprising; input means for transmitting power to the transmission; output means for delivering power from the transmission; planetary gearing means for transmitting power from said input means to said output means at a plurality of drive ratios including first fluid operated clutch means being selectively engageable and disengageable for controlling the establishment of a plurality of forward drive ratios, second fluid operated clutch means being selectively engageable and disengageable for controlling the establishment of a reverse drive ratio and cooperating with said first clutch means for establishing a one to one forward ratio; and a plurality of fluid operated friction drive establishing means being selectively engageable for cooperating with said first and second clutch means for establishing said drive ratios in said planetary gearing means; fluid pressure source means for providing fluid pressure to operate both said clutch means and said plurality of friction drive establishing means; manual selector valve means movable to a plurality of positions for selectively distributing fluid pressure from said source means to said plurality of friction drive establishing means during the establishment of all forward drive ratios except the one to one forward drive ratio and to said second clutch means during the establishment of said one to one forward drive ratio; manually operated clutch modulator valve means in fluid communication with said source means for generating a variable clutch engagement control pressure for selectively controlling the engagement and disengagement of said first and second clutch means including a valve bore, a valve spool means slidably disposed in said valve bore, cam means for generating movement in response to an operator input, spring means disposed between said cam means and said valve spool means for translating the cam generated movement to a force on said valve spool means for generating the variable control pressure in proportion to the movement of the cam means, and means connecting said cam means and said valve bore for permitting said cam means to rotate relative to said valve bore and valve spool means in a plane perpendicular to the plane in which the valve spool means is slidably disposed; and relay valve means in fluid communication with said manual selector valve means and being positionable in a forward position or a reverse position by fluid pressure from said manual selector valve means and for directing the variable clutch engagement control pressure to said first clutch means when the forward position is established and to said second clutch means when said reverse position is established for permitting selective engagement and disengagement of said clutch means by the operator when manual selector valve means is being moved between forward drive positions and to the reverse drive position.

* * * * *